United States Patent
Zimmer et al.

(10) Patent No.: US 11,268,589 B2
(45) Date of Patent: Mar. 8, 2022

(54) CYLINDER-PISTON UNIT WITH LOAD-DEPENDENT THROTTLE

(71) Applicants: Martin Zimmer, Rheinau (DE); Günther Zimmer, Rheinau (DE)

(72) Inventors: Martin Zimmer, Rheinau (DE); Günther Zimmer, Rheinau (DE)

(*) Notice: Subject to any disclaimer, the term of this patent is extended or adjusted under 35 U.S.C. 154(b) by 92 days.

(21) Appl. No.: 16/766,395

(22) PCT Filed: Nov. 24, 2018

(86) PCT No.: PCT/DE2018/000345
§ 371 (c)(1),
(2) Date: May 22, 2020

(87) PCT Pub. No.: WO2019/101258
PCT Pub. Date: May 31, 2019

(65) Prior Publication Data
US 2020/0347837 A1    Nov. 5, 2020

(30) Foreign Application Priority Data
Nov. 24, 2017    (DE) .................... 102017010876.5

(51) Int. Cl.
*F16F 9/34* (2006.01)
*F04B 7/02* (2006.01)
(Continued)

(52) U.S. Cl.
CPC .......... *F16F 9/3405* (2013.01); *F04B 7/0216* (2013.01); *F16F 9/346* (2013.01);
(Continued)

(58) Field of Classification Search
CPC .......... F16F 9/3405; F16F 9/346; F16F 9/348; F16F 9/512; F04B 7/0216
See application file for complete search history.

(56) References Cited

U.S. PATENT DOCUMENTS

| 4,166,522 A | 9/1979 | Carbon | |
| 4,337,849 A * | 7/1982 | Siorek | F16F 9/52 |
| | | | 184/6.22 |

(Continued)

FOREIGN PATENT DOCUMENTS

| DE | 3039801 A1 | 5/1982 |
| DE | 202009004752 U1 | 9/2010 |

(Continued)

*Primary Examiner* — Bradley T King
*Assistant Examiner* — James K Hsiao
(74) *Attorney, Agent, or Firm* — Smartpat PLC

(57) ABSTRACT

A cylinder-piston unit with load-dependent damping includes a piston longitudinally displaceable in a cylinder. The piston has a first piston channel and a second piston channel, which each connect a compensation space on one side of the piston to a displacement space side on an opposite side of the piston. On the displacement space side a throttle channel connects one first piston channel to the piston lateral surface. On its displacement space side the piston has a piston journal, which carries a resiliently deformable piston disc. The piston disc is displaceable and covers the throttle channel at least partially. The displacement space side has at least one relief portion deviating from a piston end face plane. The relief portion is delimited on a number of sides by a plurality of boundary lines running concentrically with respect to the central axis. Each of these boundary lines can be differentiated continuously.

10 Claims, 4 Drawing Sheets

(51) Int. Cl.
    *F16F 9/346*     (2006.01)
    *F16F 9/348*     (2006.01)
    *F16F 9/512*     (2006.01)

(52) U.S. Cl.
    CPC ............ *F16F 9/348* (2013.01); *F16F 9/3485* (2013.01); *F16F 9/512* (2013.01)

(56) References Cited

U.S. PATENT DOCUMENTS

| | | | |
|---|---|---|---|
| 4,438,833 A | 3/1984 | Schafer | |
| 4,819,773 A * | 4/1989 | Ito | F16F 9/3484 |
| | | | 188/282.5 |
| 4,993,524 A * | 2/1991 | Grundei | F16F 9/348 |
| | | | 188/282.6 |
| 5,072,812 A * | 12/1991 | Imaizumi | F16F 9/3405 |
| | | | 188/282.5 |
| 5,226,512 A * | 7/1993 | Kanari | F16F 9/512 |
| | | | 188/282.2 |
| 5,259,294 A * | 11/1993 | May | F16F 9/3214 |
| | | | 188/322.15 |
| 5,277,283 A * | 1/1994 | Yamaoka | F16F 9/512 |
| | | | 188/266.4 |
| 5,332,069 A * | 7/1994 | Murakami | F16F 9/3484 |
| | | | 188/282.6 |
| 5,595,269 A * | 1/1997 | Beck | F16F 9/3214 |
| | | | 188/282.6 |
| 5,921,360 A * | 7/1999 | Moradmand | F16F 9/512 |
| | | | 188/322.22 |
| 6,464,053 B1 * | 10/2002 | Hoebrechts | F16F 9/3405 |
| | | | 188/282.5 |
| 6,782,979 B1 * | 8/2004 | Gold | B60G 15/12 |
| | | | 188/280 |
| 7,104,369 B2 * | 9/2006 | Heyn | F16F 9/3214 |
| | | | 188/288 |
| 9,033,123 B2 * | 5/2015 | Kobayashi | F16F 9/3481 |
| | | | 188/322.15 |
| 9,038,790 B2 * | 5/2015 | Henige | F16F 9/3405 |
| | | | 188/275 |
| 9,182,005 B2 * | 11/2015 | Goldasz | F16F 9/3484 |
| 9,605,726 B2 * | 3/2017 | Baldoni | B60G 15/062 |
| 9,657,755 B2 * | 5/2017 | Wilmot | F15B 15/204 |
| 9,739,294 B2 * | 8/2017 | Wilmot | F15B 15/149 |
| 10,138,976 B2 * | 11/2018 | Miwa | F16F 9/3481 |
| 10,941,828 B2 * | 3/2021 | Franklin | F16F 9/46 |
| 2005/0061592 A1 * | 3/2005 | Heyn | F16F 9/3487 |
| | | | 188/282.3 |
| 2011/0031077 A1 * | 2/2011 | Slusarczyk | F16F 9/512 |
| | | | 188/322.15 |
| 2012/0085607 A1 | 4/2012 | Weber | |
| 2013/0105261 A1 * | 5/2013 | Murata | F16F 9/3485 |
| | | | 188/322.14 |
| 2015/0008083 A1 * | 1/2015 | Yamada | F16F 9/348 |
| | | | 188/322.15 |
| 2015/0014107 A1 * | 1/2015 | Svara | F16F 9/443 |
| | | | 188/317 |
| 2015/0114774 A1 * | 4/2015 | Kim | F16F 9/3482 |
| | | | 188/322.15 |
| 2015/0198214 A1 * | 7/2015 | Mizuno | F16F 9/512 |
| | | | 188/280 |
| 2015/0330475 A1 * | 11/2015 | Slusarczyk | F16F 9/49 |
| | | | 188/288 |
| 2018/0180134 A1 * | 6/2018 | Forster | F16F 9/5126 |
| 2018/0216691 A1 * | 8/2018 | Nagai | F16F 9/44 |
| 2018/0328445 A1 * | 11/2018 | Gilbert | F16F 9/3485 |
| 2018/0355945 A1 * | 12/2018 | De Kock | F16F 9/3482 |
| 2021/0252935 A1 * | 8/2021 | Belter | B60G 11/26 |

FOREIGN PATENT DOCUMENTS

| | | |
|---|---|---|
| DE | 102012103619 A1 | 10/2013 |
| DE | 102013001650 A1 | 7/2014 |
| DE | 202016100176 U1 | 2/2016 |
| EP | 2006480 A1 | 12/2008 |
| EP | 2472140 A1 | 7/2012 |

\* cited by examiner

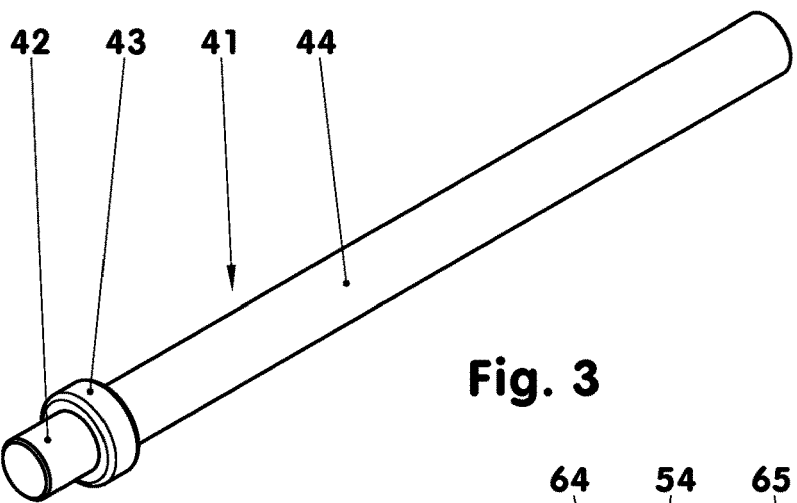
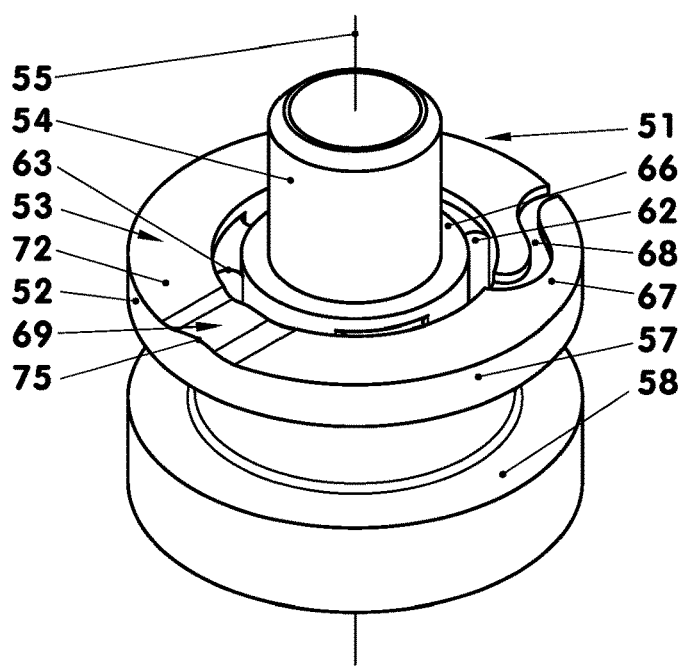
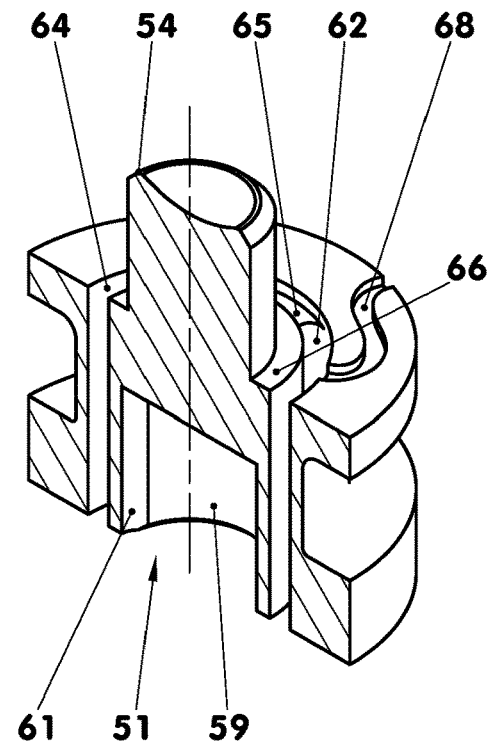
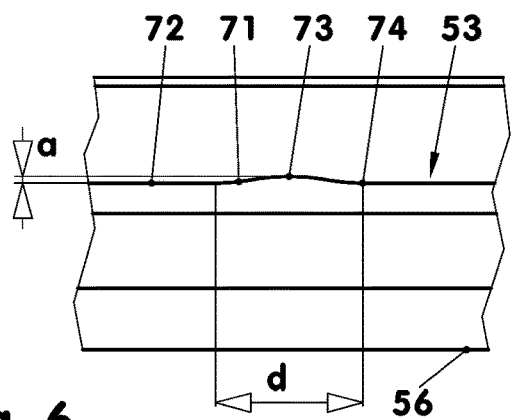
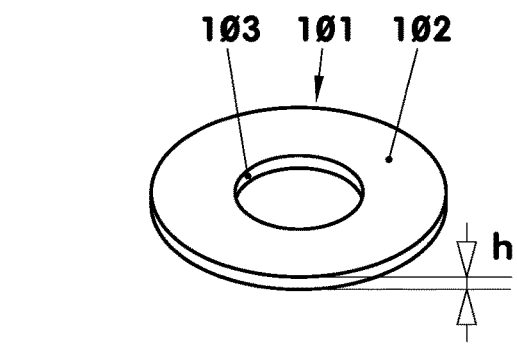
Fig. 3
Fig. 4
Fig. 5
Fig. 6
Fig. 7

A-A

CYLINDER-PISTON UNIT WITH LOAD-DEPENDENT THROTTLE

TECHNICAL FIELD

The disclosure relates to a cylinder-piston unit with a load-dependent throttle.

BACKGROUND

A damper for furniture is known from DE 20 2009 004 752 U1. At low stroke speeds, too much damping can occur in the deceleration direction.

SUMMARY

The present invention is based on the problem of developing a cylinder-piston unit with load-dependent damping. This problem is solved with the cylinder-piston unit as claimed.

A cylinder-piston unit comprises a cylinder and a piston which is displaceable in the longitudinal direction of the cylinder and which is guided by a piston rod. The piston has at least one first piston channel and at least one second piston channel, which each connect a compensation space side of the piston arranged closest to a compensation space with a displacement space side of the piston arranged closest to a displacement space. On the displacement space side, at least one throttle channel connects at least one first piston channel with the piston lateral surface. On its displacement space side the piston has a piston journal arranged concentrically with respect to its center axis oriented in the longitudinal direction. The piston journal carries a resiliently deformable piston disk which is displaceable in the longitudinal direction and covers the throttle channel at least in some sections.

The displacement space side surrounding the piston journal has at least one relief portion deviating from a piston end face plane lying normal to the center axis. "Relief" here refers to having a different height from a surrounding. The relief portion is delimited on a number of sides by a plurality of boundary lines running concentrically with respect to the center axis. Each of these boundary lines can be differentiated continuously. The relief portion is delimited by at least one continuously differentiable top line running in a radial plane. In addition, this top line is either a straight line and/or it has at least one point of maximum distance oriented in the direction of the displacement space in the normal direction to the piston end face plane.

In the cylinder-piston unit, which is, for example, hydraulic, the piston delimits a displacement space from a compensation space. When moving the piston with the piston rod connected to it in the direction of the displacement space, hydraulic oil is displaced in a partial stroke of the total stroke of the piston through the cylinder channels from the displacement space into the compensation space. At the same time, the piston disk arranged on the side of the displacement space is pressed onto the piston. Depending on the pressure building up in the displacement space, the piston channels are more or less closed, wherein the end face channel forming the throttle channel remains open during the entire stroke. When the piston is moving at high speed, the piston disk nestles up against the relief portion, such that the piston channels are closed, except for the throttle channel. If the piston moves at low speed in the direction of the displacement space, there is no deformation or only slight deformation of the piston disk, such that the piston channels remain open. The cylinder-piston unit thus has a multi-stage and load-dependent damping. During the return stroke in the direction of the compensation space, the piston disk is lifted from the piston end face, such that the damping medium can flow largely unhindered from the compensation space into the displacement space.

Further details arise from the dependent claims and the following description of schematically illustrated embodiments.

BRIEF DESCRIPTION OF THE DRAWINGS

FIG. 3: Piston rod;
FIG. 4: Piston;
FIG. 5: Longitudinal sectional view of the piston;
FIG. 6: Execution of the piston;
FIG. 7: Piston disk.

DETAILED DESCRIPTION

Figure 1:
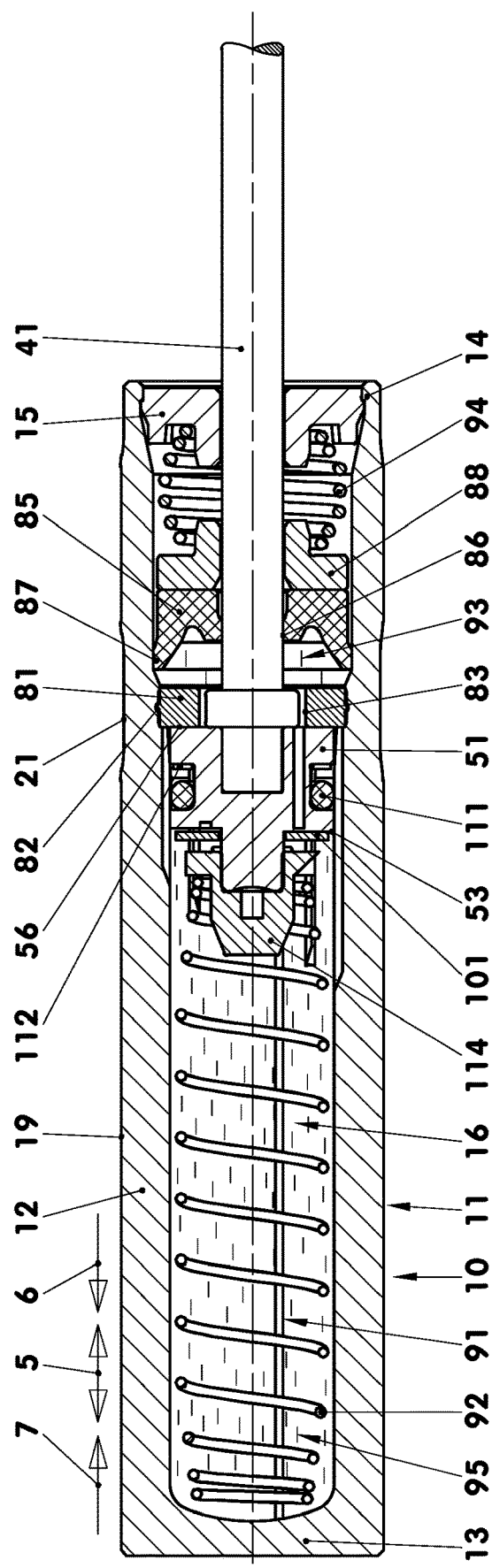
FIG. 1: Longitudinal sectional view of a cylinder-piston unit.

FIG. 1 shows a cylinder-piston unit (10). It has a cylinder (11) in which a piston (51) fastened to a piston rod (41) is guided. The cylinder (11) is formed in the shape of a pot. Its cylinder wall (12) has a ring-shaped cross-section. The cylinder base (13) is closed. The head (14) of the cylinder (11) is closed by a cylinder head cover (15). The piston rod (41) is passed through the cylinder head cover (15).

In the cylinder interior space (16) delimited by the cylinder (11) and the cylinder head cover (15), the piston (51) separates a displacement space (91) from a compensation space (93). In the exemplary embodiment, the displacement space (91) is arranged between the piston (51) and the cylinder base (13). In this design, the compensation space (93) is located between the piston (51) and the cylinder head cover (15). It is also conceivable to arrange the compensation space (93) between the piston (51) and the cylinder base (13). Then, the displacement space (91) is located between a cylinder head cover (15) carrying a piston rod seal and the piston (51).

A compression spring (92) is arranged in the displacement space (91). The spring is supported on the cylinder base (13) and on a piston attachment (114) fastened to the piston (51). In the unloaded state, the length of this compression spring (92) is greater than the stroke of the piston (51). The compression spring (92) is thus preloaded in the installed state. In the following, it is also referred to as the return spring (92).

In the illustration in FIG. 1, the piston (51) rests against a stop disk (81). This stop disk (81) is fixed in the cylinder (11). It may have a circumferential locking ring (82), which engages in a locking groove (17) of the cylinder (11). The stop disk (81) has a central aperture (83), through which the piston rod (41) passes. By this stop disk (81), the stroke of the piston (51) in the direction of the compensation space (93) is delimited.

A shaft sealing ring (85) is located on the piston rod (41) in the compensation space (93). Its interior sealing lip (86), which rests on the piston rod (41) in a sealing manner, points in the direction of the piston (51). The shaft sealing ring (85) also has an exterior sealing lip (87), which rests against the cylinder interior wall (18) in a sealing manner. The cylinder interior wall (18) is formed in this area in a cylindrical manner. The shaft sealing ring (85) is displaceable along the cylinder interior wall (18) and along the piston rod (41) in the longitudinal direction (5) of the cylinder-piston unit (10). In the illustration in FIG. 1, the shaft sealing ring (85) is in an end position arranged closest to the piston (51). In this illustration, the compensation space (93) has its smallest volume.

The shaft sealing ring (85) is supported by a support ring (88) guided on the piston rod (41). A compensation spring (94) is supported on the support ring (88) and on the cylinder head cover (15). In the illustration in FIG. 1, the compensation spring (94) formed as a compression spring (94) is slightly compressed.

Figure 2:
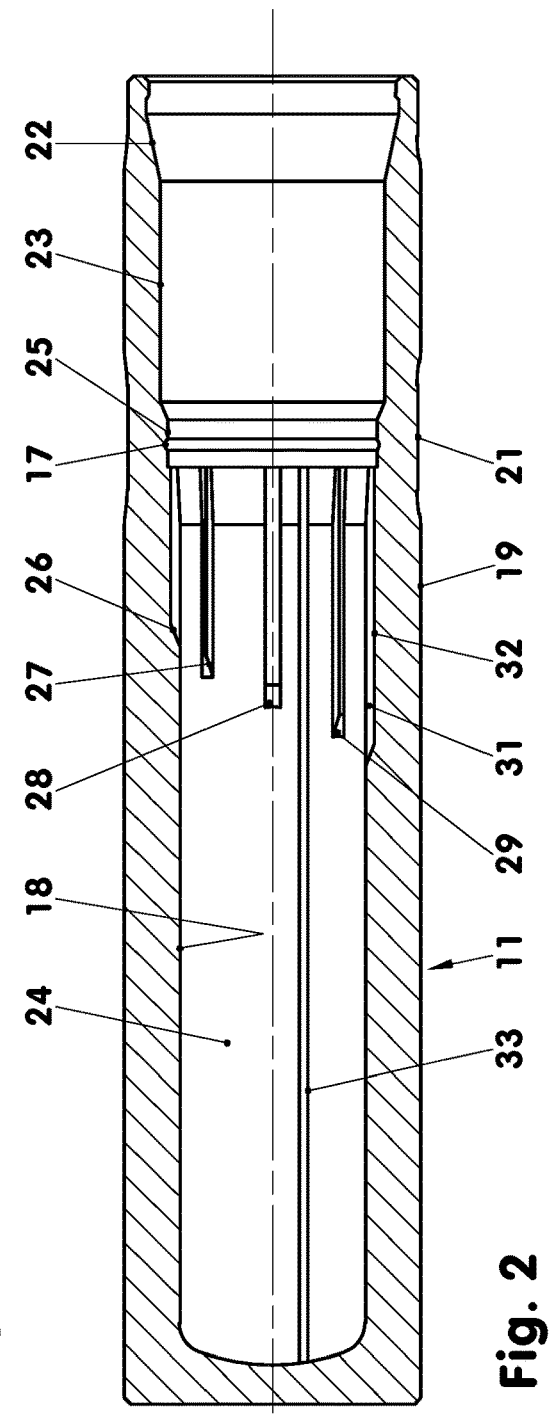
FIG. 2: Longitudinal sectional view of the cylinder.

FIG. 2 shows the cylinder (11) in a longitudinal sectional view. Its exterior surface (19) is formed to be largely cylindrical and has a wide, circumferential grip groove (21). The thickness of the cylinder wall (12) in the area of the displacement space (91) is 18% of the diameter of the cylinder (11).

The cylinder interior wall (18) has a cover receiving area (22) adjoining the cylinder head (14), a sealing element guide area (23) and a piston stroke area (24). Between the sealing element guide area (23) and the piston stroke area (24), a locking ring receiver (25) with the locking groove (17) is arranged. The diameter of the locking groove (17) is smaller than the diameter of the sealing element guide area (23).

The cover receiving area (22) is formed in the shape of a truncated cone. The point angle of the conceived cone amounts to, for example, 24 degrees. The conceived cone tip is oriented in the direction of the cylinder base (13). The exterior surface of the cylinder head cover (15) is also formed in the shape of a truncated cone.

The smaller diameter of the truncated cone corresponds to the diameter of the sealing element guide area (23). The sealing element guide area (23) is formed to be cylindrical. Its length in the exemplary embodiment amounts to 30% of the length of the piston stroke. The piston stroke is the travel path of the piston (51) oriented in the longitudinal direction (5) when moving from the first end position at the stop disk (81) into a second end position at the cylinder base (13).

The piston stroke area (24) has, for example, eight cylinder channels (26-31) oriented in the longitudinal direction (5) in its area turned away from the cylinder base (13). These are arranged in a manner radially offset to one another on the cylinder interior wall (18). They may lie on a common pitch circle and each have the same cross-section in a plane lying normal to the longitudinal direction (5). This amounts to, for example, in each case 5 per mille of the internal cross-section of the cylinder (11) in the area adjoining the cylinder base (13). The groove base (32) is aligned with the locking ring receiver (25). In the exemplary embodiment, all cylinder channels (26-31), of which five are shown in FIG. 2, have different lengths. Thereby, the longest cylinder channel (31) is 2.4 times longer than the shortest. The length of the longest cylinder channel (31) in the exemplary embodiment amounts to 57% of the piston stroke. The area adjoining the cylinder base (13) is formed to be cylindrical and is aligned with the cylinder interior wall (18) between the cylinder channels (26-31). In the illustration in FIG. 2, for example, an additional longitudinal cylinder channel (33) has the length of the piston stroke area (24).

The cylinder channels (26-31) may also have the same length in pairs. It is also conceivable to arrange the cylinder channels (26-31), for example, in a spiral shape in the cylinder interior wall (18).

FIG. 3 shows the piston rod (41). Its length amounts to, for example, 1.6 times the piston stroke. It may be made of a metallic material. The piston rod (41) has a cylindrically formed insertion area (42), a support collar (43) and a guide area (44). The length of the insertion area (42) amounts to, for example, 6.7% of the length of the piston rod (41). The diameter of the insertion area (42) and the guide area (44) amounts to, for example, 37% of the diameter of the cylinder interior (16) in the area adjacent to the cylinder base (13). The diameter of the support collar (43) amounts to one and a half times such diameter. In the exemplary embodiment, the length of the support collar (43) amounts to 4% of the length of the piston rod (41).

FIG. 4 shows the piston (51) in an isometric view. FIG. 5 shows such piston (51) in an isometric sectional view. The piston (51) has a largely cylindrical piston body (52), which is delimited in the direction of the compensation space (93) by a compensation space side (56) and in the direction of the displacement space (91) by a displacement space side (53).

On its displacement space side (53), the piston (51) has a piston journal (54) seated on the piston body (52). The piston journal (54) is arranged coaxial to the center line (55) of the piston (51) oriented in the longitudinal direction (5). Its length oriented in the longitudinal direction (5) amounts to, for example, 38% of the length of the piston (51). Its diameter has the same ratio in relation to the diameter of the piston (51). In the assembled state, a piston disk (101), which is displaceable in the longitudinal direction (5), and the piston attachment (114) are seated on the piston journal (54). The displacement space side (53) and the piston attachment (114) then delimit the displacement path of the piston disk (101).

The piston body (52) has a cylindrical lateral surface (57) with a circumferential annular groove (58). A piston sealing ring (111) and a washer disk (112) are located in this annular groove (58) when the piston (51) is mounted. Thereby, the washer disk (112) is arranged at the end of the annular groove (58) oriented in the direction of the compensation space (93). In the illustration in FIG. 1, the piston sealing element (111) formed as an O-ring has an oval cross-sectional area along its annular guide line.

The compensation space side (56) has an insertion recess (59). The length of such insertion recess (59) oriented in the longitudinal direction (5) is slightly longer than the insertion area (42) of the piston rod (41). Together with the inserted piston rod (41), it forms, for example, an interference fit, wherein air can escape through a venting channel (61) during assembly.

In the exemplary embodiment, the compensation space side (56) and the displacement space side (53) are connected to each other by three piston channels (62-64). Such piston channels (62-64) penetrate the piston body (51) in the longitudinal direction (5). In a plane lying normal to the longitudinal direction (5), they lie on a common pitch circle. The diameter of this pitch circle amounts to, for example, 56% of the diameter of the piston (51). Along the longitudinal direction (5), all piston channels (62-64) have a constant, kidney-shaped cross-section. The cross-sectional area of an individual piston channel (62-64) in a plane lying normal to the longitudinal direction (5) amounts to, in the exemplary embodiment, 3.2% of the maximum cross-sectional area of the piston (51) in a plane lying normal to the longitudinal direction (5).

On the displacement space side (53), the piston channels (62-64) are connected to each other in this exemplary embodiment by, for example, impressed annular channel sections (65). In each case, one annular channel section (65) connects two adjacent piston channels (62, 63; 62, 64; 63, 64). The individual annular channel sections (65) have a rectangular cross-sectional area. The depth of the annular channel sections (65) oriented in the longitudinal direction (5) is half the width oriented in the radial direction of the displacement space side (53). This width corresponds to the width of the piston channels (62-64) in the same plane.

The piston channels (62-64) and the annular channel sections (65) divide the displacement space side (53) into an interior area (66) and an exterior area (67). The interior area (66) adjoins the piston journal (54) and is surrounded by the piston channels (62-64) and the annular channel sections (65). The exterior area (67) is delimited by the piston lateral surface (57). The piston (51) can also be formed without the annular channel sections (65). Both the interior area (66) and the exterior area (67) lie largely in a piston end face plane (72) lying normal to the center axis (55) of the piston (51).

The piston lateral surface (57) and a first piston channel (62) are connected to each other on the displacement space side (53) by a throttle channel (68). The length of this throttle channel (68) impressed into the displacement space side (53) amounts to, for example, 90% of the radius of the piston (51). In the exemplary embodiment, the cross-section of this end face channel (68) in curved form amounts to three-quarters of the cross-section of an annular channel section (65). The throttle channel (68) opens both into the first piston channel (62) and into the piston lateral surface (57) in the radial direction.

The displacement space side (53) also has a relief portion (69) deviating from the piston end face plane (72). In this exemplary embodiment, the relief portion (69) is an end face elevation (75). In the illustration in FIG. 4, the end face elevation (75) has the shape of a bar (75). This bar (75) is arranged symmetrically to a radial plane containing the center axis (55) and connects, for example, a second piston channel (63) with the piston lateral surface (57). Over its length oriented in the radial direction, it has, for example, a constant cross-section. The end face elevation (75) can also connect the piston journal (54) with the piston lateral surface (57). Thereby, the bar (75) may overlap the second piston channel (63). The end face elevation (75) can also be arranged between two piston channels (62, 63; 63, 64; 62, 64). It is conceivable to arrange it only in the exterior area (67) or only in the interior area (66). Instead of a bar, it can be formed as a spherical cap, a knob, etc.

FIG. 6 shows an unwound view of the piston (51) along its lateral surface (57). In such view, the end face elevation (75) is delimited by a continuously differentiable boundary line (71). In a coordinate system, the abscissa of which is a circumferential line of the piston (51) and the ordinate of which is oriented parallel to the center line (55), exactly one value of the ordinate is assigned to each value of the abscissa. This boundary line (71) merges tangentially into the adjacent area of the piston end face plane (72). A tangent at the maximum (73) of the boundary line (71) is parallel to the piston end face plane (72) and is spaced therefrom in the direction of the displacement space (91). In the illustration in FIG. 6, the boundary line (71) has the shape of a complete period of a cosine curve symmetrical to the ordinate at the maximum (73). The two minima (74) of this exemplary embodiment lie in the piston end face plane (72). Such minima form two same kind extreme values (74) of the boundary line (71). The maximum (73), an additional extreme value (73), forms the tip of the end face elevation (75). Instead of a point, the maximum (73) can also be formed as a flattened area, for example. For example, each boundary line (71) of the piston (51) concentric around the center line (55) of the piston (51) and overlapping the end face elevation (75) can be formed as a continuously differentiable line. The height of the bar (75) oriented in the longitudinal direction (5) amounts to, for example, less than three-eighths of the arc length of the bar width oriented in the circumferential direction. For example, the cross-sectional area of the bar (75) corresponds to the cross-sectional area of the throttle channel (68). Other shapes of the boundary line (71) are also conceivable.

Figure 13:
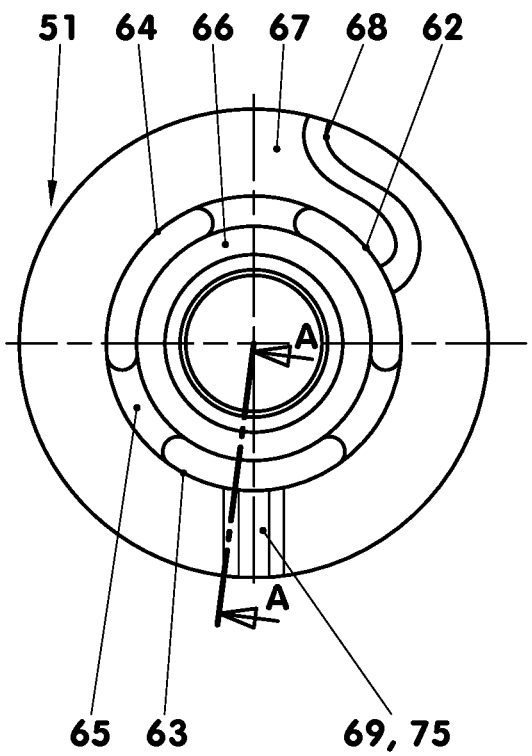
FIG. 13: Top view of the piston from FIG. 4.
Figure 14:
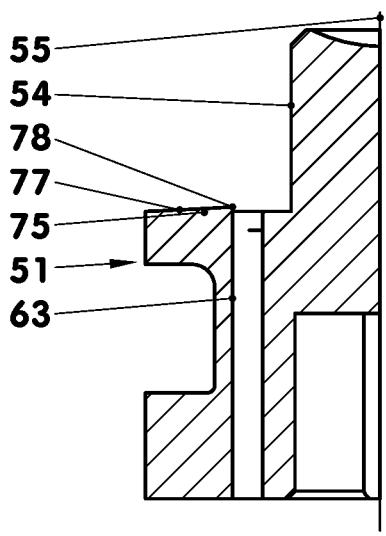
FIG. 14: Sectional view A-A from FIG. 13.

FIG. 13 shows a top view of the piston (51) from the displacement space side (53). FIG. 14 shows a half-section of the piston (51). The sectional plane of this illustration is a radial plane. The relief portion (69) is delimited by a top line (77) running in this radial plane. Such top line (77) is a continuously differentiable line. It has a point of maximum distance (78) lying normal to the piston end face plane (72). Such point of maximum distance (78) is oriented in the direction of the displacement space (91). In this exemplary embodiment, each top line (77) lying in a radial plane is either a rising or falling straight line lying parallel to the piston end face plane (72), or a curve deviating relatively from the piston end face plane (72) in the direction of the displacement space (91).

FIG. 7 shows the piston disk (101). This is an annular disk (101) with two end faces (102) plane-parallel to each other and a central bore (103). In the exemplary embodiment, the inside diameter of the piston disk (101) is 10% larger than the outside diameter of the piston journal (54). The outside diameter of the piston disk (101) amounts to, for example, 93% of the outside diameter of the piston (51). In the exemplary embodiment shown, the piston disk (101) has a thickness of 0.3 millimeters. For example, such thickness is twice the height of the end face elevation (75).

The piston disk (101), for example, is made of polyoxymethylene (POM). Such material has a modulus of elasticity (E) of 2800 megapascals. Its yield stress (σs) amounts to 67 megapascals and its hardness amounts to Scale D 81 Shore according to EN ISO 868.

The distance (d) between two same kind extreme values (73; 74) of the boundary line (71) can be selected along the arc line around the center axis (55) of the piston (51) as a function of the piston disk (101). For example, this distance (d) results in $$d>=(9.6*a*h*E*S/\sigma s)^{1/2}.$$

Therein, the following applies:
d: Distance between extreme values of the same kind (73; 74) [mm]
a: Maximum height of the relief portion (69) [mm]
h: Thickness of the piston disk (101) [mm]
E: Modulus of elasticity of the piston disk (101) [Mpa]
S: Safety factor against failure [–]
σs: Yield stress of the piston disk (101) [MPa].

The distance (d) between the two same kind extreme values (73; 74) is thus greater than or equal to the positive root of 9.6 times the product of the maximum height (a) of the relief portion (69), the thickness (h) of the piston disk (101), the modulus of elasticity of the piston disk (101), a safety factor and the reciprocal of the yield stress of the material of the piston disk (101). In the exemplary embodiment, the distance (d) is the distance between the two minima (74).

During assembly the piston (51) may first fitted with the piston sealing ring (111) and the washer disk (112). The piston disk (101) is pushed onto the piston journal (54) and the piston attachment (114) is fastened. The insertion area (42) of the piston rod (41) is inserted and fixed into the insertion recess (59) of the piston (51). It is glued, for example. The support collar (43) of the piston rod (41) then rests flat on the piston (51). In the exemplary embodiment, it is glued to the compensation space side (56) of the piston (51). This pre-assembly unit is inserted together with the return spring (92) into the cylinder (11) pre-filled with oil (95), for example. Subsequently, the stop disk (81) is fixed in the cylinder (11) and the shaft seal ring (85) is pushed onto the piston rod (41). After inserting the support ring (88), the compensation spring (94) is pushed onto the piston rod (41) and the cylinder (11) is closed by the cylinder head cover (15). A different sequence of assembly is also conceivable.

When operating the cylinder-piston unit (10), the piston rod (41) and the piston (51) are in the initial position as shown in FIG. 1. The displacement space (91) has its maximum volume. The compensation space (93) has its minimum volume. When the piston rod (41) is loaded, it is moved relative to the cylinder (11) in the stroke direction (6) in the direction of the displacement space (91).

Figure 8:
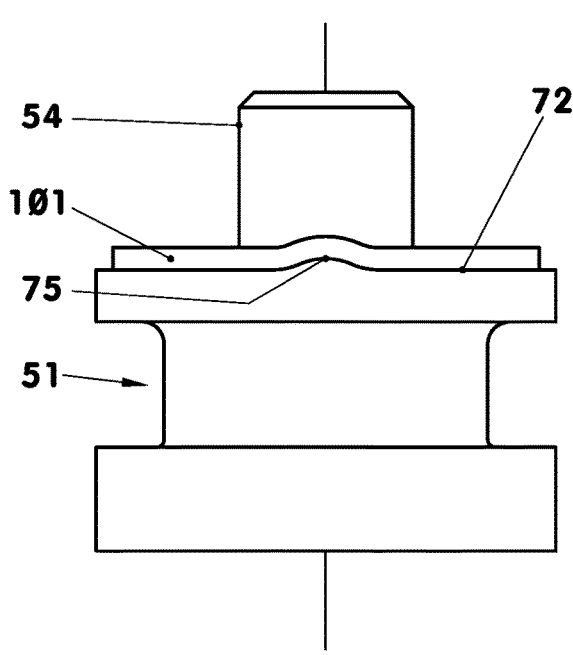
FIG. 8: Piston and piston disk at high load.

The displacement space (91) is compressed. Thereby, oil (95) is initially displaced from the displacement space (91) into the compensation space (93) through all cylinder channels (26-31) and, for example, the longitudinal cylinder channel (33). When the piston rod (41) travels at high speed and/or a high load is applied to the piston rod (41), the piston disk (101) is pressed onto the displacement space side (53) of the piston (51). FIG. 8 shows the piston (51) with the piston disk (101) in contact. The piston disk (101) has nestled itself against the surface of the displacement space side (53) lying in the piston end face plane (72) and against the end face elevation (75). For example, the second piston channel (63) is completely closed on the displacement space side. However, the second piston channel (63) can also be closed except for a residual cross-section, which has the cross-sectional area of the throttle channel (68). The third piston channel (64) is closed on the displacement space side. However, the third piston channel (64) can also be formed in the same manner as the first piston channel (62) or as the second piston channel (63). The first piston channel (62) is connected to the displacement space (91) via the throttle channel (68), such that both the throttle channel (68) and the first piston channel (62) are flowed through by the oil (95). Oil (95) also flows through the annular channel sections (65) into the second piston channel (63) and into the third piston channel (64). The movement of the piston (51) and the piston rod (41) is only slightly decelerated, such that no impact noise is generated.

As the stroke of the piston rod (41) increases in the stroke direction (6), individual cylinder channels (26-31) end. The flow cross-section between the displacement space (91) and the compensation space (93) decreases. The piston disk (101) continues to rest against the displacement space side (53) of the piston (51). The deceleration of the piston (51) and the piston rod (41) increases. The return spring (92) is compressed in the displacement space (91). In the compensation space (93), the shaft sealing ring (85) and the support ring (88) are moved in the direction of the cylinder head (14), wherein the compensation spring (93) is compressed.

As the piston rod (41) and piston (51) continue to move in the stroke direction (6), the sum of the cross-sections of the cylinder channels (26-31) is reduced. The piston disk (101) continues to rest against the piston end face (53) on the displacement space side. The deceleration of the piston (51) and the piston rod (41) increases further, wherein the speed of the piston (51) decreases further.

As soon as the piston (51) leaves the area of the longitudinal channels (26-31), the piston sealing ring (111) rests against the support disk (112) and the cylinder interior wall (18), for example in a largely sealing manner. The piston disk (101) is further pressed onto the piston (51) and closes the displacement space side (53) except for the throttle channel (68). From the displacement space (91), the oil (95) flows through the throttle channel (68) and the piston channels (62-64) along with, for example, the longitudinal piston channel (33) into the compensation space (93). Here, the shaft seal ring (85) is displaced further relative to the piston rod (41) and relative to the cylinder (11) in the direction of the cylinder head cover (15). In the displacement space (91), the return spring (92) is further compressed. In the compensation space (93), the compensation spring (94) is further compressed.

As soon as there is an equilibrium between the load acting on the piston rod (41) and the counterforce in the displacement space (91), the piston (51) and the piston rod (41) stop relative to the cylinder (11). If necessary, the return spring (92) can partially relax, wherein the piston (51) is displaced in the direction of the cylinder head cover (15).

After removing the load, the return spring (92) pushes the piston (51) and the piston rod (41) out in the return stroke direction (7), which is oriented against the stroke direction (6). The oil (95) from the compensation space (93) flows through all piston channels (62-64) and lifts the piston disk (101) off the piston end face (53) on the displacement space side. For example, the piston disk (101) rests against the piston attachment (114). The relaxing compensation spring (94) presses the support ring (88) and the shaft seal (85) in the direction of the stop disk (81). As soon as the piston (51) reaches the area of the cylinder channels (26-31), additional oil (95) flows from the compensation space (93) through such cylinder channels (26-31) into the displacement space (91). The return stroke is completed when the piston (51) rests against the stop disk (81). The piston rod (41) is now fully extended. The cylinder-piston unit (10) has now returned to its initial position as shown in FIG. 1.

Figure 9:
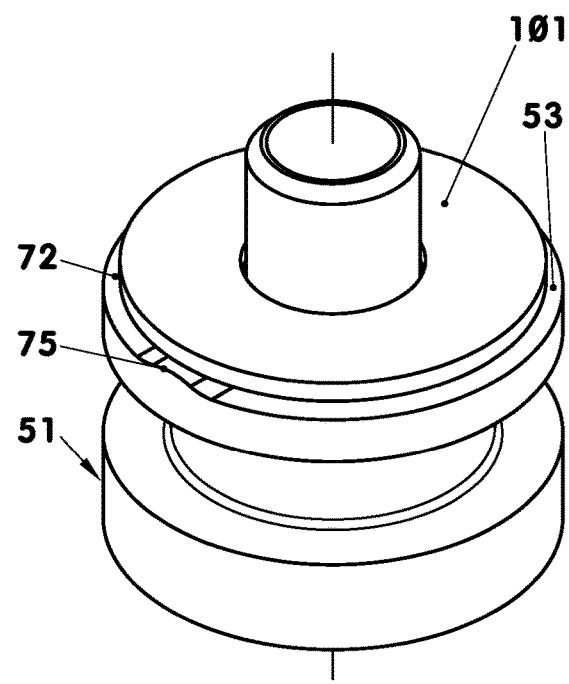
FIG. 9: Piston and piston disk at low load.

When the load and/or the travel speed of the piston rod (41) is low, the piston disk (101) rests against the end face elevation (75), see FIG. 9. The piston disk (101) is not deformed or is only slightly deformed and lies, for example, in a manner parallel or inclined to the plane of the piston end face (72). The oil (95) displaced from the displacement space (91) initially flows through both the cylinder channels (26-31) and all piston channels (62-64) into the compensation space (93). The piston (51) and the piston rod (41) are only slightly decelerated. In this case as well, as the stroke of the piston (51) increases in the stroke direction (6), the sum of the cross-sectional areas of the cylinder channels (26-31) decreases, by which the deceleration of the piston (51) and the piston rod (41) is increased.

As soon as the piston (51) has left the area of the cylinder channels (26-31), the piston sealing ring (111) rests with its circumferential line against the cylinder interior wall (18). The piston disk (101) can remain in its position relative to the piston end face plane (72). However, the pressure building up in the displacement space (91) can also press the piston disk (101) against the displacement space side (53) of the piston (51), as described above. Depending on the position of the piston disk (101) relative to the displacement space side (53) of the piston (51), the oil (95) displaced from the displacement space (91) flows only through the throttle channel (68) or directly into the piston channels (62-64).

The return stroke of the piston (51) and the piston rod (41) is performed as described above.

Figure 10:
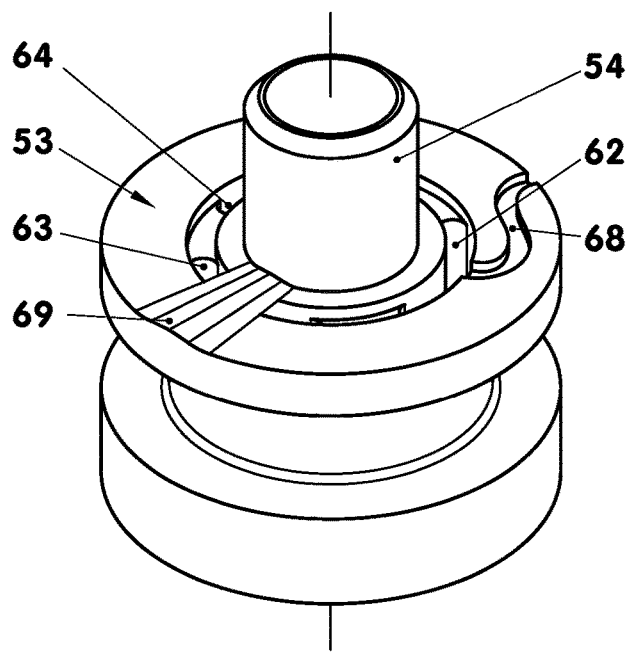
FIG. 10: Piston with radially outwardly increasing end face elevation.

FIG. 10 shows an additional embodiment of an end face elevation (75). The cross-sectional area of the end face elevation (75) formed like a bar increases in the radial direction from the inside to the outside. This increase may be formed to be linear. On the piston lateral surface (57), the cross-sectional area of the end plate elevation (75) corresponds, for example, to the corresponding area of the exemplary embodiment shown in FIGS. 1-9, 13 and 14. In the exemplary embodiment in FIG. 10, the aforementioned distance (d) of the minima (74) applies, for example, to each boundary line (71) of the end plate elevation (75) concentric around the center axis (55). In this exemplary embodiment, for example, each top line (77) of the end face elevation (75) lying in a radial plane is a straight line. Such straight line has the greatest distance lying normal to the piston end face plane (72) at the piston lateral surface (57).

This piston (51) is used as described in connection with the previous exemplary embodiment. In this exemplary embodiment, if a high load is applied, the piston disk (101) is also pressed against the piston end face (53) on the displacement space side. Thereby, the piston disk (101) is deformed in its area adjacent to its bore (103) by a smaller amount than in the exterior area.

When applying a small load, the piston disk (101) can be skewed relative to the piston (51). It then lies on the end face elevation (75) and on the area of the displacement space side (53) lying in the piston end face plane (72). The large clearance between the piston journal (54) and the bore (103) prevents the piston disk (101) from tilting.

Figure 11:
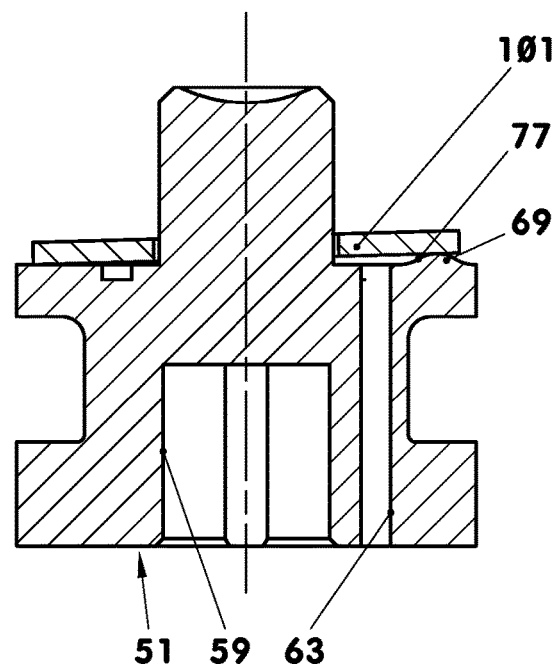
FIG. 11: Sectional view of piston with knob-like elevation and piston disk.

FIG. 11 shows a sectional view through a piston (51) with a knob-like end face elevation (75) and a piston disk (101). In this illustration, the end face elevation (75) is arranged in the exterior area (67) of the displacement space side (53). It is located here between a second piston channel (63) and the piston lateral surface (57). However, the end face elevation (75) can also be arranged between an annular channel section (65) and the piston lateral surface (57). It can also cover the annular channel section (65) and/or the piston channel (63) in certain areas. It is also conceivable to arrange the end face elevation (75) in the interior area (66) of the displacement space side (53).

The knob (75) is formed as a spherical section at its maximum (73). At all edge surfaces, it merges tangentially into the piston end face plane (72). Each of the boundary lines (71) that delimit the relief portion (69) on a number of sides and run concentrically with respect to the center axis (55) of the piston (51) is a continuously differentiable curve with two minima (74) and one maximum (73). The same applies to the top lines (77) lying in the radial planes.

When this piston (51) is used in the cylinder-piston unit (10), with a high load acting in the stroke direction (6), the piston disk (101) is pressed against the area of the displacement space side (53) lying in the piston end face plane (72) and the end face elevation (75). The piston disk (101) deforms and nestles against the displacement space side (53) of the piston (51). The piston (51) is closed except for the throttling channel (68).

If only a small load is applied, the piston disk (101) remains at least largely undeformed. For example, it is inclined relative to a normal plane to the center axis (55) of the piston (51). The oil (95) can now flow largely unhindered from the displacement space (91) into the compensation space (93).

Figure 12:
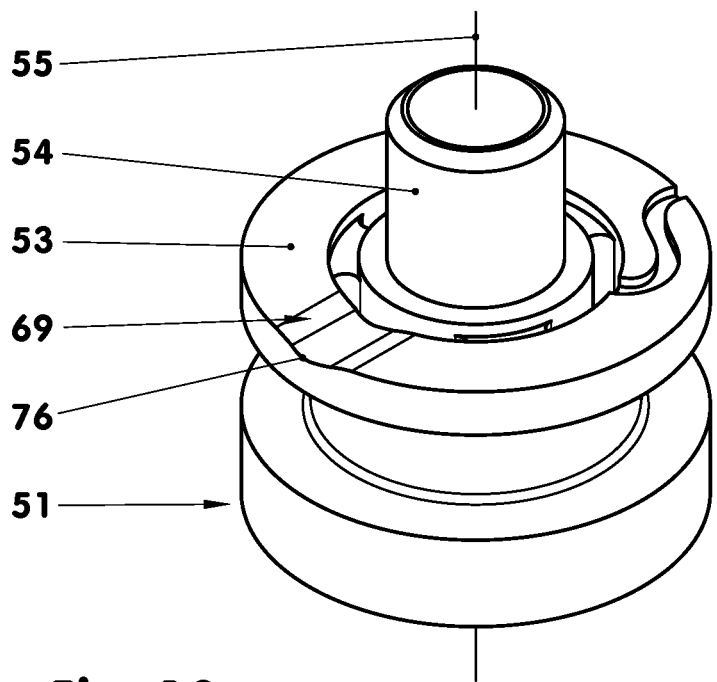
FIG. 12: Piston with passage depression.

FIG. 12 shows a further piston with a relief portion (69). In this exemplary embodiment, the relief portion (69) is formed as a passage depression (76) deviating from the piston end face plane (72). This passage depression (76) is impressed into the piston end face (53) on the displacement space side. It penetrates the exterior area (67), for example in the radial direction. The passage depression (76) connects, for example, a second piston channel (63) with the piston lateral surface (57). The passage depression (76) is delimited by a large number of continuously differentiable boundary lines (71) running concentrically with respect to the center axis (55). Each of these boundary lines (71) runs on a lateral surface of a conceived cylinder, whose center line coincides with the center axis (55) of the piston. This boundary line (71) has two same kind extreme values (73), which in this exemplary embodiment are formed as maxima (73). A minimum (74) as a further extreme value (74) lies between them. In both the maxima (73) and the minimum (74), the tangent is parallel to the piston end face plane (72) in a coordinate system, the abscissa of which is a circular arc section around the center axis (55). The distance between the two maxima (73) corresponds, for example, to the distance (d) in the aforementioned formula.

In a radial plane of the piston (51) containing the center axis (55), the passage depression (76) is delimited by a top line (77). At least the top line (77) containing the minimum (74) of the boundary line (71) is a straight line.

When the cylinder-piston unit (10) is operated under high load, the piston disk (101) is pressed against the displacement space side (53). Thereby, it nestles up against the passage depression (76), such that it is closed, for example. When moving in the return stroke direction (7), the piston disk (101) is lifted off.

If only a small load is applied, the piston disk (101) rests against the displacement space side (53) in a largely undeformed manner. The passage depression (76) remains open, such that oil (95) displaced from the displacement space (91) can flow through it.

Instead of a single relief portion (69), the piston (51) can also have a plurality of relief portions (69). These may be identical to one another or may have different designs.

Combinations of the individual exemplary embodiments are also conceivable.

LIST OF REFERENCE SIGNS

5 Longitudinal direction
6 Stroke direction
7 Return stroke direction
10 Cylinder-piston unit
11 Cylinder
12 Cylinder wall
13 Cylinder base
14 Head of (11), cylinder head
15 Cylinder head cover
16 Cylinder interior space
17 Locking groove
18 Cylinder interior wall
19 Lateral surface
21 Grip groove
22 Piston stroke area
23 Sealing element guide area
24 Piston stroke area
25 Locking ring receiver 26 Cylinder channel
27 Cylinder channel
28 Cylinder channel
29 Cylinder channel
31 Cylinder channel, longest cylinder channel
32 Groove base
33 Longitudinal cylinder channel
41 Piston rod
42 Insertion area
43 Support collar
44 Guide area
51 Piston
52 Piston body
53 Displacement space side, piston end face on the displacement space side
54 Piston journal
55 Center line, center axis
56 Compensation space side
57 Lateral surface, piston lateral surface
58 Annular groove
59 Insertion recess
61 Venting channel
62 Piston channel, first piston channel
63 Piston channel, second piston channel
64 Piston channel, third piston channel
65 Annular channel section
66 Interior area
67 Exterior area
68 Throttle channel, end face channel
69 Relief portion
71 Boundary line
72 Piston end face plane
73 Maxima, extreme values of (71)
74 Minima, extreme values of (71)
75 End face elevation, bar, knob
76 Passage depression
77 Top line
78 Point of maximum distance lying normal to (72)
81 Stop disk, fitting disk
82 Locking ring
83 Aperture
85 Shaft seal ring
86 Interior sealing lip of (22)
87 Exterior sealing lip of (22)
88 Support ring
91 Displacement space
92 Compression spring, return spring
93 Compensation space
94 Compensation spring, compression spring
95 Oil
101 Piston disk, annular disk
102 End face of (101)
103 Bore
111 Piston sealing ring, piston sealing element
112 Washer disk
114 Piston attachment
a Maximum height of the relief portion (69)
d Distance between same kind extreme values (73; 74)
h Thickness of the piston disk (101)

The invention claimed is:

1. A cylinder-piston unit (10), comprising:
a cylinder (11); and
a piston (51) which is displaceable in a longitudinal direction (5) of the cylinder (11) and which is guided by a piston rod (41),
wherein the piston (51) has at least one first piston channel (62) and at least one second piston channel (63), which each connect a compensation space side (56) of the piston (51) facing a compensation space (93) with a displacement space side (53) of the piston (51) facing a displacement space (91),
wherein, on the displacement space side (53), at least one throttle channel (68) connects at least one first piston channel (62) with a piston lateral surface (57), and
wherein the piston (51) on its displacement space side (53) has a piston journal (54) arranged concentrically with respect to its center axis (55) oriented in the longitudinal direction (5),
wherein the piston journal (54) carries a resiliently deformable piston disk (101) which is displaceable in the longitudinal direction (5) and covers the throttle channel (68) at least in some sections, and
wherein the displacement space side (53) surrounding the piston journal (54) has at least one relief portion (69) deviating from a piston end face plane (72) lying normal to the center axis (55), and
wherein the relief portion (69) is delimited on a number of sides by a plurality of boundary lines (71) running concentrically with respect to the center axis (55),
wherein each of these boundary lines (71) can be differentiated continuously, and
wherein the relief portion (69) is delimited by at least one continuously differentiable top line (77) running in a radial plane, and
wherein the top line (77) is either a straight line and/or has at least one point of maximum distance (78) oriented in the direction of the displacement space (91) in the normal direction to the piston end face plane (72), and
wherein each of the boundary lines (71) includes, as two same kind extreme values (73; 74), either two minima (74) or two maxima (73), a distance (d) of which along an arc line around the center axis (55) is greater than or equal to the positive root of 9.6 times the product of a maximum height (a) of the relief portion (69), a thickness (h) of the piston disk (101), a modulus of elasticity of the piston disk (101), a safety factor and the reciprocal of a yield stress of a material of the piston disk (101).

2. The cylinder-piston unit (10) according to claim 1, wherein the relief portion (69) is either an end face elevation (75) or a passage depression (76) radially penetrating an exterior area (67) of the displacement space side (53) surrounding the at least one first piston channels (62) and the at least one second piston channel (63).

3. The cylinder-piston unit (10) according to claim 2, wherein at least one end face elevation (75) is formed as a radial bar, which connects the piston journal (54) and the piston lateral surface (57).

4. The cylinder-piston unit (10) according to claim 1, wherein a height of the relief portion (69) parallel to the center axis (55) is less than an arc length of its width.

5. The cylinder-piston unit (10) according to claim 1, wherein a cylinder interior wall (18) of the cylinder (11) has at least two cylinder channels (26-31) of different length oriented in the longitudinal direction (5), a dimension of which, oriented in the longitudinal direction (5), is shorter than a length of a cylinder interior (16).

6. The cylinder-piston unit (10) according to claim 5, wherein the length, measured in the longitudinal direction (5), of the longest cylinder channel (31) of the at least two cylinder channels (26-31) is shorter than a maximum stroke of the piston (51) relative to the cylinder (11).

7. The cylinder-piston unit (10) according to claim 1, wherein the displacement space side (53) faces a cylinder base (13).

8. The cylinder-piston unit (10) according to claim 1, wherein the piston rod (41) has a support collar (43) resting flat on the piston (51).

9. A cylinder-piston unit (10), comprising:
a cylinder (11); and
a piston (51) which is displaceable in a longitudinal direction (5) of the cylinder (11) and which is guided by a piston rod (41),
wherein the piston (51) has at least one first piston channel (62) and at least one second piston channel (63), which each connect a compensation space side (56) of the piston (51) facing a compensation space (93) with a displacement space side (53) of the piston (51) facing a displacement space (91),
wherein, on the displacement space side (53), at least one throttle channel (68) connects at least one first piston channel (62) with a piston lateral surface (57), and
wherein the piston (51) on its displacement space side (53) has a piston journal (54) arranged concentrically with respect to its center axis (55) oriented in the longitudinal direction (5),
wherein the piston journal (54) carries a resiliently deformable piston disk (101) which is displaceable in the longitudinal direction (5) and covers the throttle channel (68) at least in some sections, and
wherein the displacement space side (53) surrounding the piston journal (54) has at least one relief portion (69) deviating from a piston end face plane (72) lying normal to the center axis (55), and
wherein the relief portion (69) is delimited on a number of sides by a plurality of boundary lines (71) running concentrically with respect to the center axis (55),
wherein each of these boundary lines (71) can be differentiated continuously, and
wherein the relief portion (69) is delimited by at least one continuously differentiable top line (77) running in a radial plane, and
wherein the top line (77) is either a straight line and/or has at least one point of maximum distance (78) oriented in the direction of the displacement space (91) in the normal direction to the piston end face plane (72), and
wherein a height of the relief portion (69) parallel to the center axis (55) is less than an arc length of its width.

10. A cylinder-piston unit (10), comprising:
a cylinder (11); and
a piston (51) which is displaceable in a longitudinal direction (5) of the cylinder (11) and which is guided by a piston rod (41),
wherein the piston (51) has at least one first piston channel (62) and at least one second piston channel (63), which each connect a compensation space side (56) of the piston (51) facing a compensation space (93) with a displacement space side (53) of the piston (51) facing a displacement space (91),
wherein, on the displacement space side (53), at least one throttle channel (68) connects at least one first piston channel (62) with a piston lateral surface (57), and
wherein the piston (51) on its displacement space side (53) has a piston journal (54) arranged concentrically with respect to its center axis (55) oriented in the longitudinal direction (5),
wherein the piston journal (54) carries a resiliently deformable piston disk (101) which is displaceable in the longitudinal direction (5) and covers the throttle channel (68) at least in some sections, and
wherein the displacement space side (53) surrounding the piston journal (54) has at least one relief portion (69) deviating from a piston end face plane (72) lying normal to the center axis (55), and
wherein the relief portion (69) is delimited on a number of sides by a plurality of boundary lines (71) running concentrically with respect to the center axis (55),
wherein each of these boundary lines (71) can be differentiated continuously, and
wherein the relief portion (69) is delimited by at least one continuously differentiable top line (77) running in a radial plane, and
wherein the top line (77) is either a straight line and/or has at least one point of maximum distance (78) oriented in the direction of the displacement space (91) in the normal direction to the piston end face plane (72),
wherein a cylinder interior wall (18) of the cylinder (11) has at least two cylinder channels (26-31) of different length oriented in the longitudinal direction (5), a dimension of which, oriented in the longitudinal direction (5), is shorter than a length of a cylinder interior (16).

* * * * *